United States Patent [19]
Clifford et al.

[11] Patent Number: 5,904,832
[45] Date of Patent: *May 18, 1999

[54] REGENERATION OF ACTIVE CARBON AND POLYMERIC ADSORBENTS

[75] Inventors: Arthur L. Clifford, Everett; Dennis F. Dong, Kingston; Timothy A. Mumby, Kingston; Derek J. Rogers, Kingston, all of Canada

[73] Assignee: Huron Tech Canada, Inc., Kingston, Canada

[*] Notice: This patent is subject to a terminal disclaimer.

[21] Appl. No.: 08/810,688

[22] Filed: Feb. 28, 1997

Related U.S. Application Data

[63] Continuation-in-part of application No. 08/771,053, Dec. 20, 1996, Pat. No. 5,702,587.

[51] Int. Cl.⁶ ........................................................ C02F 1/46
[52] U.S. Cl. ............................ 205/756; 205/768; 204/242; 204/277; 204/294; 210/668; 210/670; 210/759; 210/909
[58] Field of Search ................................ 205/756, 768; 204/242, 277, 294; 210/668, 670, 759, 909

[56] References Cited

U.S. PATENT DOCUMENTS

| | | | |
|---|---|---|---|
| 3,730,885 | 5/1973 | Makrides et al. | 210/30 |
| 4,131,526 | 12/1978 | Moeglich | 204/149 |
| 4,217,191 | 8/1980 | Doniat et al. | 204/130 |
| 4,260,484 | 4/1981 | Connolly | 252/411 R |
| 4,834,852 | 5/1989 | Wabner | 204/131 |
| 5,232,484 | 8/1993 | Pignatello | 588/206 |
| 5,414,204 | 5/1995 | Hosono et al. | 588/210 |
| 5,702,587 | 12/1997 | Clifford et al. | 205/760 |
| 5,716,528 | 2/1998 | Jasim et al. | 210/688 |

FOREIGN PATENT DOCUMENTS

| | | |
|---|---|---|
| 2027374 | 4/1992 | Canada . |
| 505610 | 3/1976 | U.S.S.R. . |

OTHER PUBLICATIONS

Journal of Applied Electrochemistry 23, (1993) Accounts of Chemical Research, vol. 8, 125, 1975.
Khimiya i Tekhnologiya Vody, vol. 6, No. 6, pp. 509–511 (1984).

*Primary Examiner*—Arun S. Phasge
*Attorney, Agent, or Firm*—Andrew E. Pierce

[57] ABSTRACT

Method for the regeneration of active carbon and polymeric adsorbents having oxidizable, organic pollutants adsorbed thereon by electrochemical and chemical means and apparatus therefor. The method involves a desorption step and a decomposition step. Desorption is accomplished in one embodiment by flowing an aqueous stream at a preselected pH through the adsorbent material. Generally, decomposition is accomplished by contacting an aqueous stream containing an organic pollutant with hydroxyl radicals. Sequential or simultaneous desorption and decomposition can also take place during electrolysis in an electrolytic cell. During decomposition the active carbon can be made a carbon bed electrode of the cell. Electrolysis to produce peroxide can take place in the presence of a transition metal or a chelate of a transition metal while feeding an oxygen containing gas to the electrolysis cell.

19 Claims, 1 Drawing Sheet

REGENERATION OF ACTIVE CARBON AND POLYMERIC ADSORBENTS

This is a continuation-in-part of application Pat. Ser. No. 08/771,053 filed on Dec. 20, 1996 now U.S. Pat. No. 5,702,587.

TECHNICAL FIELD

This invention relates to the chemical and electrochemical regeneration of the adsorptive capacity of active carbon and polymeric adsorbents having adsorbed, oxidizable, organic materials thereon.

BACKGROUND ART

The use of activated carbon for the purification of drinking water, the tertiary treatment of sewage water, and, generally, the industrial use of activated carbon to remove impurities from process streams is well known. Industrial wastes, particularly, those containing organic materials that are not easily biodegraded are usefully removed from process streams by adsorption on activated carbon. However, to be economically feasible for use on a large scale, the activated carbon after it has become saturated with organic material must be capable of regeneration in order to allow its reuse. By the methods of the prior art the activated carbon can be regenerated either thermally or by solvent extraction or discarded, for instance, in a landfill. Activated carbons contain a high surface area and are available in various forms including powder and granular activated carbons, carbon felts, and two dimensional activated carbon cloth.

The prior art method of thermal regeneration of activated carbon which has become saturated with organic pollutants requires that the material be shipped to a specialized facility where the material is heated to about 900° C. in an atmosphere of reduced oxygen. The organic compound pollutants are destroyed by incineration and the carbon is reactivated thereby. However, about 10 to about 15 percent by weight of the carbon is lost by oxidization during the thermal regeneration process. Steam thermal regeneration is also practiced in a specialized facility utilizing lower temperatures and, hence, less carbon is lost by oxidation during processing. During the steam thermal regeneration method, the organic pollutant is separated from the carbon but is not destroyed. Solvent extraction methods for regeneration of activated carbon also remove the organic contaminant from the carbon but in this process about 10 to about 15 percent of the pores of the active carbon are blocked by the extraction solvent which remains behind subsequent to the solvent extraction process.

Accordingly, the primary object of this invention is to provide a new and improved method of regenerating activated carbon and polymeric adsorbents subsequent to saturation to allow reuse without any substantial loss of activity. Still another object of the invention is to provide a method of enhancing the adsorption capacity of activated carbon utilizing an apparatus which is also effective in regenerating the activated carbon.

A method is disclosed in U.S. Pat. No. 4,260,484 to Connolly for renewing the adsorptive capacity of a bed of active carbon. In this process, a bed of activated carbon saturated with an hydroxyaromatic compound is made the positive electrode of an electrolytic cell. A positive potential is applied to the carbon in order to transform the adsorbed organic compound into a species which has either a high affinity for the carbon or a low affinity for the conducting solution of the electrolytic cell. Thereafter, the applied potential is withdrawn and an effluent containing hydroxyaromatic compounds is introduced to the bed of activated carbon. Additional compounds can now be removed from the effluent. Connolly cites various patents directed to the electrochemical treatment of effluents or activated carbon, namely U.S. Pat. No. 3,730,864 to TarJanyi et al., U.S. Pat. No. 3,730,885 to Makrides et al. and U.S. Pat. No. 4,131,526 to Moeglich. Each of these cited patents relate to the electrochemical treatment of an organic material either as an aqueous solution or adsorbed on a mass of active carbon.

In U.S. Pat. No. 4,217,191 to Doniat et al., a process is disclosed for regenerating activated carbon particles contaminated by oxidizable impurities by suspension of such particles of activated carbon in an aqueous solution of an electrolyte which is loaded into an electrolytic cell in which a voltage is applied to the electrodes of said cell so as to liberate atomic oxygen at the surface of an anode. As the suspension of particles of activated carbon is passed through the anode compartment of the cell, the particles contact the anode electrode and the atomic oxygen generated thereon. The oxidizable impurities are destroyed and the activated carbon is regenerated.

In U.S. Pat. No. 5,414,204 to Hosono et al., activated carbon having an organochlorine compound adsorbed thereon is reactivated by treatment with ionizing radiation which results in decomposition of the organochlorine compound previously adsorbed on the activated carbon. The carbon can be further used after subsequent treatment to activate the carbon.

In U.S. Pat. No. 5,232,484 to Pignatello, a method is disclosed for degrading an organic pesticide present in an acidic, aqueous solution in the presence of light by reaction with an hydroxyl radical produced by the reaction of a ferric ion and a peroxide, preferably, hydrogen peroxide.

In U.S. Pat. No. 4,834,852 to Wabner, a process is disclosed for the oxidation of organic substances in an aqueous medium by exposure to an hydroxyl radical (Fenton's reagent) formed by the reaction of a mixture of hydrogen peroxide and iron (II) salts. In the process of Wabner, hydrogen peroxide is continuously added to an electrolytic cell which is supplied with direct current to achieve a current density of about 0.4 to about 50 milliamps per square centimeter. The process of the invention converts difficultly degradable or toxic substances in an aqueous medium into biologically degradable or degraded substances. The cathode material of the electrolytic cell of Wabner can be titanium, nickel, graphite, synthetic carbon or valve materials such as titanium, zirconium, and tantalum which have been coated wholly or partially with a platinum metal. The anodes can be graphitic or dimensionally stable valve metal anodes. The pH of the electrolyte of the cell of Wabner can be 0 to about 14, although, generally, the oxidation reaction takes place more quickly at pH values of less than 8. Instead of oxidation with Fenton's reagent, Wabner also suggests the use of a direct current in the electrolytic cell to activate the hydrogen peroxide so as to cause oxidation of the degradable or toxic substances. Fenton's reagent is also disclosed in U.S. Pat. No. 5,538,636 to Gnann et al. as useful in a process for chemically oxidizing waste water.

In The *Journal of Applied Electrochemistry* 23 (1993) Hsiao et al. disclose the use of Fenton's reagent, produced by the reaction of ferric salts, with electrolytically generated hydrogen peroxide to produce hydroxyl radicals which are used to oxidize chlorobenzene and phenol. Reaction with electrogenerated Fenton's reagent in an electrolytic cell reduces the concentrations of chlorobenzene and phenol in the electrolyte. The electrolytic cell used for the reaction contains a reticulated, vitreous carbon cathode and a platinum anode. Electrolysis is conducted at a current density of 0.7 milliamps per square centimeter. The three hydroxylated reaction products obtained are identified as catechol, resorcinol, and hydroquinone with catechol being the dominant product. Further work illustrating the versatility of the hydroxyl radical in oxidation reactions with organic compounds is described in *Accounts of Chemical Research*, 8, 125, 1975, "Fenton's Reagent Revisited", Walling, C.

It is known that other transition metals besides iron can be used to produce hydroxyl radicals from hydrogen peroxide in aqueous solution. Examples of these agents include selected aqueous ions of the following metals: titanium, chromium, copper, and tin. Other transition metals which exhibit variable ionic oxidation states in aqueous solution may also be useable.

Other methods of producing hydroxyl radicals are described in *Chemical Engineering*, September 1994, pages 16–20 under the terms Advanced Oxidation Processes, incorporated herein by reference. In addition to using a Fenton's reagent system to generate hydroxyl radicals, the reaction of hydrogen peroxide with ultraviolet light or ozone is known to produce hydroxyl radicals. In U.S. Pat. No. 4,792,407 a combination of ultraviolet radiation, ozone, and hydrogen peroxide is used to oxidize organic compounds in an aqueous system.

DISCLOSURE OF THE INVENTION

In one embodiment of the invention the process and apparatus of the invention involves the use of highly oxidative hydroxyl radicals which are capable of degrading oxidizable, organic contaminant materials adsorbed on active carbon or other non-conductive adsorbent material.

The hydroxyl radicals can be produced utilizing the well known Fenton's reagent system in which hydrogen peroxide is reacted with a ferrous ion under acid conditions. In addition, the Applicants have produced hydroxyl radicals under alkaline conditions by forming a chelate of a transition metal ion and reacting the chelate with hydrogen peroxide. Alternative methods of producing hydroxyl radicals which are known in the prior art under the term advanced oxidation processes can also be utilized to produce hydroxyl radicals with which to decompose an oxidizable, organic material subsequent to desorption from a mass of adsorbent material in accordance with the process of the invention.

In another embodiment of the invention, oxidizable, organic contaminant materials are degraded by conducting electrolysis using a mass of activated carbon having adsorbed contaminants as a cathode bed without the presence of oxidative hydroxyl radicals.

Representative oxidizable, organic contaminants are volatile and semivolatile organics such as halogenated and non-halogenated organics, fuel hydrocarbons, and pesticide compounds. Preferred organic contaminants are the hydroxyaromatics disclosed in U.S. Pat. No. 4,260,484, incorporated herein by reference. Representative pesticides are the aromatic pesticides such as those disclosed in U.S. Pat. No. 5,232,484, incorporated herein by reference. Other representative organic contaminants are disclosed in *Remediation Technologies Screening Matrix and Reference Guide*, Version I, July 1993, U.S. Pat. No. Environmental Protection Agency and U.S. Pat. No. Air Force, incorporated herein by reference.

It is known in the prior art that an aqueous mixture of ferrous ions and hydrogen peroxide at a pH of about 2 to about 3 results in the formation of hydroxyl radicals, the active component of Fenton's reagent. The hydroxyl radical is known in the prior art as an effective oxidant for a wide variety of organic chemicals. Fenton's reagent is an aqueous mixture which can be produced by the reaction of transition metal ions, such as ferrous ions and hydrogen peroxide in accordance with equation (1)

$$Fe^{2+}+H_2O_2+H^+ \rightarrow Fe^{3+}+HO.+H_2O \tag{1}$$

In accordance with the generally accepted mechanism for the oxidation of organic chemicals by Fenton's reagent, an organic compound, RH is reacted with an hydroxyl radical, HO., to yield water and an organic radical, R., in accordance with equation (2)

$$HO.+RH \rightarrow R.+H_2O \tag{2}$$

The organic radical formed in equation (2) further reacts with the ferric ion formed in reaction 1 to form ferrous ion and a decomposition product of the starting organic chemical in accordance with equation (3)

$$R.+Fe^{3+} \rightarrow Fe^{2+}+\text{decomposition product, } R_1 \tag{3}$$

Other transition metal ions such as the ferric ion catalyze the decomposition of hydrogen peroxide to produce ferrous ion and the $HO_2.$ radical in accordance with equation (4)

$$Fe^{3+} + H_2O_2 \rightleftharpoons (FeO_2H)^{2+} + H^+ \dashrightarrow Fe^{2+} + HO_2\cdot + H^+ \tag{4}$$

Fenton's reagent can also be produced by the catalysis of hydrogen peroxide by complexed ferric ions. Such a complex of iron III and ethylenediaminetetraacetic acid, EDTA, is disclosed by Walling in the previously cited article, "Fenton's Reagent Revisited", as forming an intensely purple complex with hydrogen peroxide at pH 8. This complex is a catalyst both for the decomposition of hydrogen peroxide and the oxidation of organic compounds.

In accordance with one embodiment of the invention, the reaction of ferrous ions with electrogenerated hydrogen peroxide in an electrolytic cell having a carbon cathode containing adsorbed, oxidizable, organic materials and a conventional metallic anode or, alternatively, a high oxygen overvoltage anode such as a lead dioxide anode or a platinized titanium anode allows the oxidation of the oxidizable, organic materials once these are desorbed from the carbon bed cathode. The substantial decomposition of the oxidizable, organic materials, thus, permits the regeneration of the carbon. The presence of light or an external source of hydrogen peroxide is not required to carry out the process of the invention.

The hydroxyl radicals can be produced by reacting ferrous ions and electrogenerated hydrogen peroxide at a low electrolyte pH of about 2 to about 3 in an electrolytic cell which provides a preselected electrical potential on a mass of carbon serving as the cathode of the cell to result in the formation of hydrogen peroxide as an oxygen containing gas is fed to the cathode of the cell. The use of an electrolytic cell in which hydrogen peroxide is continuously produced provides a source of hydrogen peroxide for reaction in accordance with equation (1) to produce hydroxyl radicals as a means of oxidizing pollutants desorbed from the activated carbon or other adsorbent material.

In another embodiment of the invention, by operating the electrolytic cell at a high pH of about 8 or higher, preferably, about 8 to about 9 in the presence of a transition metal ion, preferably, an iron (III) salt dissolved in an electrolyte in combination with a chelating agent such as ethylenediaminetetraacetic acid (EDTA), it has been found that hydroxyl radicals are also formed by the decomposition of electrogenerated hydrogen peroxide. At both the low pH or high pH conditions, the hydroxyl radicals formed in the electrolyte are capable of oxidizing organic compounds, once these compounds are desorbed from the activated carbon or other adsorbent material permitting its reuse for further adsorption of organic pollutants. Useful chelating agents for use in forming complexes with transition metal ions at high pH conditions include nitriloacetic acid and hemin in addition to EDTA. In these embodiments of the process of the invention, the organic materials are substantially destroyed, that is, the organic materials are substantially decomposed by conversion to carbon dioxide and water leaving only trace amounts of the original organic compounds adsorbed on the carbon bed.

A necessary step in the regeneration of activated carbon or other adsorbent in the regeneration process of the invention is the desorption of an oxidizable, organic material from a mass of adsorbent material such as activated carbon. This is accomplished in one embodiment of the invention in which the adsorbent material is carbon by applying a preselected potential on the mass of carbon which is made an electrode of an electrolytic cell. Preferably, the carbon electrode is made the cathode of the cell to effect desorption of the organic contaminant material. The preselected potential applied to the carbon electrode can vary depending upon the nature of the organic material adsorbed on the carbon. Desorption of the organic material may require that the carbon electrode be made the anode of the cell to effectively desorb certain organic materials.

As indicated in the above discussion of prior art methods of electrolytically enhancing the adsorptive capacity of a carbon bed for organic pollutants, it is known to enhance the adsorption capacity of a carbon bed by applying a positive potential to a bed of carbon having adsorbed hydroxyaromatic compound pollutants. Connolly in U.S. Pat. No. 4,260,484 transforms the hydroxyaromatic compound into a species which has either a lower affinity for the carbon or a higher affinity for the conducting solution used in the electrolytic cell. It is theorized that this procedure results in the deadsorption, or stripping, of the hydroxyaromatic compound out of the carbon. A modification of this procedure is disclosed in U.S. Pat. No. 3,730,885 and in *Proceedings of the Electrochemical Society*, Volume 94–19, pages 99–110, entitled "Electrochemical Removal of Pentachlorophenol from Aqueous Solutions", MacDougall et al.

In accordance with another embodiment of the invention, the process of the invention for decomposition of oxidizable, organic material adsorbed on a carbon bed can be combined with the Connolly process for enhancing the adsorptive capacity of a carbon bed. Using the electrochemical cell apparatus of the invention, for instance, an aqueous stream polluted with organic compounds can be directed into an activated carbon bed electrode of an electrolytic cell, while the electrodes of the electrolytic cell are maintained at open circuit potential, until no further adsorption occurs. Thereafter, electrolysis is conducted by making the carbon bed the anode of the electrolytic cell. The application of a positive potential to the carbon bed in the presence of an electrolyte results in an increase of the adsorptive capacity of the carbon bed in accordance with the teaching of U.S. Pat. No. 4,260,484. Thereafter, transition metal ions are added to the electrolyte and the carbon bed is made the cathode of the electrolytic cell and impressed with a preselected negative potential while feeding an oxygen containing gas to the cell containing said carbon bed cathode. Hydroxyl radicals are generated insitu in the presence of the transition metal ions. The carbon bed is regenerated by decomposition of the oxidizable, organic material.

Alternatively, instead of the application of a positive potential to a carbon bed in order to desorb an oxidizable, organic material from an adsorbent material such as an activated carbon, it has been found that desorption of such organic pollutants adsorbed on a mass of carbon or other adsorbent material can be accomplished by the application of a negative potential or merely by contacting the mass of carbon or other adsorbent material with an aqueous liquid at a pH of about 1 to about 14, preferably, an alkaline aqueous liquid which is, most preferably, highly alkaline, having a pH of about 10 or higher. Optionally, when the adsorbent material is carbon, the carbon is, preferably, polarized negatively and an oxygen containing gas is fed to the carbon cathode while conducting electrolysis. Thereafter, destruction, or decomposition, of the desorbed pollutant is accomplished by conducting an electrolysis step or merely contacting the desorbed pollutant with hydroxyl radicals. Hydroxyl radicals are generated in situ, as more fully described below in a Fenton's Reagent System or produced by reacting hydrogen peroxide with ultraviolet light, ozone, or ozone and ultraviolet light.

As alternative adsorbents to active carbon, non-conductive synthetic adsorbents derived from macroreticular copolymer technology can be used. There are two classes of synthetic adsorbents based on macroreticular surfaces. One class, the polymeric adsorbents were introduced in the 1960's. These are copolymers of styrene/divinylbenzene or copolymers of acrylic esters which are in the form of microspheres held together to form macrospherical beads. The agglomeration of the microspheres results in a macroreticular network forming a microporous matrix interspersed with macro- and mesoporous areas of pore structure that are highly porous and have a high surface area which allows migration of sorbate molecules to the adsorption sites.

A second class of synthetic adsorbents based on macroreticular copolymer technology are the sulfonated polymeric styrene-divinylbenzene copolymers which are termed carbonaceous adsorbents. These can be manufactured with many small pores in addition to meso- and macropores. These adsorbents yield highly surface active adsorbents with properties ranging from hydrophilic adsorbents to hydrophobic adsorbents. Like their polymeric adsorbent counterparts, these adsorbents possess high adsorbitivety for organic molecules as well as similar kinetics of adsorption. These synthetic adsorbents offer variability in pore size, pore volume, and pore distribution as well as high surface areas and unique surface chemistries. These synthetic adsorbents have additional benefits over activated carbon in that the carbonaceous adsorbents perform extremely well with low level contaminants (ppb to ppm) and the polymeric adsorbents, while having reduced capacity in comparison with the carbonaceous adsorbents provide superiority in the adsorption of a higher level of contaminants (ppm).

The generation of hydroxyl radicals can take place in accordance with a known Fenton's Reagent System at a pH of about 1 to about 4, preferably, 2 to about 3. In addition, at a pH of about 8 or higher, preferably, about 8 to about 9 hydroxyl radicals are produced by the reaction of ferric ions and a chelating agent, preferably, a complex of ferric ions and EDTA with hydrogen peroxide. At a pH above about 9.5, precipitation of iron oxide occurs. Depending upon the specific oxidizable, organic pollutant adsorbed on the carbon bed, oxidation of an organic pollutant with hydroxyl ions can take place in certain embodiments of the process of the invention to regenerate the carbon bed either at the above high or low pH. The oxidation and carbon regeneration process of the invention can be conducted successively with the prior art process of U.S. Pat. No. 4,260,484 for enhancement of the adsorptive capacity of a carbon bed, utilizing electrolytes in the electrolytic cell which are adjusted either to a high pH, generally, about pH 8 or higher, preferably, of about 8 to about 9 or a low pH, preferably, to about 2 to about 3.

In one embodiment of the organic material destruction/desorption process of the invention, an oxygen containing gas is fed to an electrolytic cell, when the adsorbent material is a mass of carbon. The mass of carbon is made the cathode of the electrolytic cell and electrolysis is conducted while feeding an oxygen containing gas to the cell. The oxygen feed rate provides at least 0.5, preferably, about 1.5 to about 2.5 times the stoichiometric amount required based upon the electrical current required to obtain the preselected negative potential necessary for the desorption and decomposition of the oxidizable, organic material. Desorption from an activated carbon material or other adsorbent material of oxidizable, organic materials can also be accomplished by contacting the adsorbent material with an aqueous liquid at a preselected pH of about 1 to about 14, preferably an alkaline aqueous liquid, most preferably, having a pH of about 10 or higher.

The process of the invention is capable of providing greater than 99.9 percent by weight decomposition of an oxidizable, organic pollutant adsorbed on an adsorbent material such as a carbon bed without resulting in a significant loss of the adsorptive capacity of the carbon as occurs in prior art thermal and organic solvent regeneration processes for renewing the adsorptive capacity of carbon. In addition, there is substantially no blockage of adsorption sites on the carbon as the result of the regeneration process of the invention and, accordingly, the 10 to 15 percent loss of adsorptive capacity which occurs during solvent regeneration of carbon does not occur. An especially advantageous result of the process of the invention is that the regeneration of the adsorptive capacity of the adsorbent material can take place on the site at which the adsorbent material has been loaded with organic contaminants. Not only is the regeneration process suitable for use at the site at which the adsorbent is used, but the same container utilized for the adsorption of oxidizable contaminants by the adsorbent from a waste stream can be used in the process of the invention. Thus, the adsorbent need never leave the container in which it is used to purify a waste stream. Additional advantages of the regeneration process of the invention result from the fact that the chemical and electrochemical regeneration process can be conducted at ambient temperatures and without the use of organic solvents.

DESCRIPTION OF THE PREFERRED EMBODIMENTS

When an electrolyte is used in the process of the invention it should be suitably conductive to minimize the cell voltage. Useful electrolytes include aqueous solutions of both inorganic and organic compounds. In addition to the use in the following Examples of an aqueous solution of sodium sulphate, inorganic compounds such as potassium sulphate, sodium hydroxide, sulfuric acid, and phosphoric acid can be used in the formation of aqueous electrolyte solutions. Organic compounds such as acetic acid, sodium acetate, and citric acid and its salts can also be used in the formation of aqueous electrolytes for use in the electrolytic cell of the invention. The electrolyte concentration should be of a strength to carry the required current density at a reasonable voltage so that the electrolysis cell does not produce excessive heat which can damage the materials of construction.

Sodium sulphate, sodium hydroxide, and sodium chloride have been used as electrolytes in the electrolytic cells of the invention. Each provide sufficient conductivity to maintain the operating regeneration voltage low enough to be practical. However, utilizing sodium chloride as an electrolyte results in the production of chlorine during electrolysis. The chlorine can be an effective agent in the destruction of organic pollutants but the chlorination of organic compounds adsorbed on the carbon can result in organic intermediates which are as toxic or more toxic than the original organic pollutant. For this reason, an aqueous solution of sodium chloride is not preferred as an electrolyte in the electrolytic cells of the invention.

The activated carbon which can be used as a mass of carbon forming a carbon bed electrode in the process and apparatus of the invention is not limited to a carbon having a particular nature or morphology. Any type of activated carbon can be employed. Various high surface area carbons can be formed into a carbon bed for the adsorption of organic materials from a waste stream. In addition, mixtures of prior art carbon chip bed electrodes, characterized as high surface area carbon black adsorbed on graphite chips and bound with an hydrophobic Teflon® binder, with active carbon such as granular activated carbon, powdered activated carbon powder, and activated carbon felt are useful.

The process of the invention can be operated at room temperature. Accordingly, the temperature limits for conducting the electrolytic and chemical processes of the invention are only limited by reduced solubility at low temperatures, the reduced reaction rate at low temperatures, and lower hydrogen peroxide production yields and other difficulties of operating at high temperatures. Generally, the process temperature limits are about 0° C. to about 50° C., preferably, about 20° C. to about 40° C.

For the formation of Fenton's reagent in one embodiment of the invention at the preferred pH of about 2 to about 3, a soluble iron salt is preferred which will provide ferrous ions. For another embodiment of the regeneration process of the invention in which hydroxyl radicals are produced at the preferred pH of about 8 to about 9, a soluble ferric salt is preferred for the formation of a ferric iron complex with a chelating agent, preferably, ethylenediaminetetraacetic acid (EDTA). Other chelate complexes, such as ferric ion with nitriloacetic acid; diethylenetriaminepentaacetic acid and salts thereof; hydroxyethylethylenediaminetriacetic acid and salts thereof; diethylenetriaminepentamethylene phosphoric acid and salts thereof; cyclohexylenedintrilotetraacetic acid and salts thereof; ethylenebis(oxyethylenenitrilo)tetraacetic acid and salts thereof; and hemin, can also be used. These complexes are capable of catalyzing the decomposition of hydrogen peroxide so as to release hydroxyl radicals. While the iron salt can be present in excess without unduly slowing the desired reaction with hydrogen peroxide to produce the highly oxidative hydroxyl radicals, when the iron salts are present in an excess, insoluble iron oxides tend to slowly form. Accordingly, to minimize plugging of the adsorbent material, it is desirable to minimize the concentration of iron in the electrolyte. In view of the fact that there is a decrease in the rate of oxidizable, organic pollutant destruction at trace iron concentrations, the iron salt used to produce hydroxyl radicals in a Fenton's Reagent System should be present at a maximum concentration of about 0.1M. As iron oxides precipitate from solution during the electrolysis, in order to maintain the reaction resulting in the formation of hydroxyl radicals, replacement must be made of that portion of the soluble iron which forms a precipitate. Generally, the useful range of soluble iron is from trace levels to 0.1M, preferably, 0.001 to 0.01M.

During the embodiments of the regeneration process of the invention in which an electrolytic cell is used to produce hydrogen peroxide, it is, generally, desirable for effective decomposition of the organic material to provide added oxygen above that produced at the anode of the cell. The oxygen generated at the anode must be entrained or dissolved in the aqueous electrolyte and carried from the anode to the carbon bed cathode. Since the amount of oxygen produced at the anode of the electrolytic cell is approximately one half the stoichiometric amount required for oxygen reduction to form hydrogen peroxide, the additional oxygen provides an excess of oxygen at the mass of carbon forming a carbon bed. In the Examples which follow, pure oxygen has been used as the oxygen containing gas which is added to the carbon bed cathode during regeneration of the carbon bed. However, other sources of oxygen can be used including air. Preferably, when using air as the oxygen containing gas, the carbon dioxide present in the air is first removed. Thus, any gas can be used containing enough oxygen to satisfy the stoichiometric current requirements according to Faraday's Laws and in a large enough concentration to satisfy mass transfer requirements, i.e., the oxygen should not be so dilute so that the rate of oxygen migration is insufficient to support the current flowing through the electrolytic cell. The carbon dioxide present in the air can be removed by flowing the air through a caustic scrubber prior to directing the air into the electrolytic cell.

In the disclosed Examples illustrating certain embodiments of the regeneration process of the invention as applied to phenol in which an electrolytic cell is used to generate hydrogen peroxide, a mass of carbon serving as a carbon bed electrode is, preferably, made the cathode of the electrolytic cell. In another embodiment, when other non-conductive adsorbents or carbon are regenerated, effective desorption of oxidizable, organic materials is achieved merely by subjecting the adsorbent material to an aqueous liquid at a preselected pH, preferably, an alkaline aqueous liquid. For organic pollutants other than phenol adsorbed on an active carbon, a positive instead of a negative polarization may be required during regeneration of the carbon bed, consisting of desorption and decomposition of oxidizable, organic pollutants. Experimentation will provide a basis for the choice of positive or negative polarization of a carbon bed adsorbent. The anode of the electrolytic cell in the Examples which follow is an electrode consisting of a platinum-iridium coating on a titanium substrate.

Figure 1:
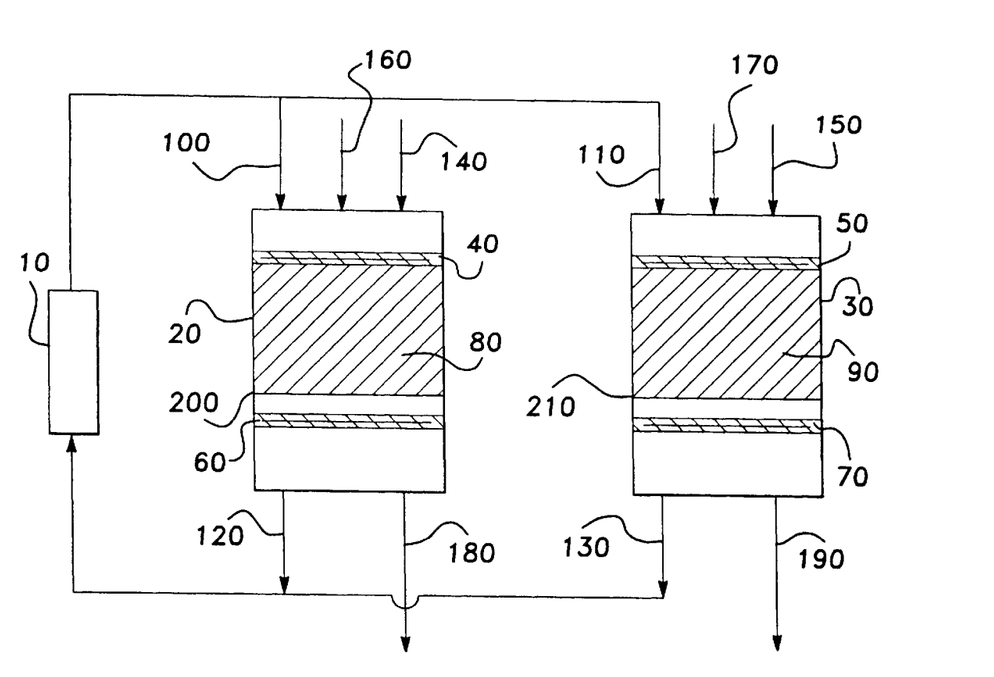
The FIGURE is a diagrammatic, sectional view of a pair of electrolytic cells 20 and 30 arranged in parallel. Each of the cells 20 and 30 are used sequentially for adsorption of contaminants from aqueous waste streams fed to said cells through conduits 160 and 170 and for enhancing adsorption, desorption, and regenerating the adsorptive capacity of carbon beds 80 and 90.

As will be apparent on review of the FIGURE, the apparatus used for enhancing the adsorption, desorption, and the regeneration of the adsorptive capacity of a mass of carbon in accordance with one embodiment of the process of the invention can comprise at least one electrolytic cell having a carbon bed as an electrode of said cell during the carbon regeneration phase. In one embodiment of the apparatus of the invention, provision is made for the flow of a waste stream containing oxidizable, organic materials through a carbon bed, the interruption of the flow of the waste stream through the carbon bed, and the flow of an oxygen containing gas and an electrolyte into the carbon bed to replace the flow of the waste stream while maintaining a preselected electrical potential on said carbon bed. During regeneration of a carbon bed adsorbent in one embodiment the electrical potential is maintained on said mass of carbon while maintaining the pH of the electrolyte, containing a source of transition metal ions, preferably ferrous ions, at a low pH of about 2 to about 3. Alternatively, in another embodiment the pH of the electrolyte can be maintained at a high pH of about 8 or higher, preferably, about 8 to about 9 when the electrolyte contains transition metal ions, preferably, ferric ions and a chelating agent such as EDTA.

Where in one embodiment of the apparatus of the invention two or more electrolytic cells are provided, each containing carbon beds, the flow of a waste stream through at least one of the electrolytic cells is effected in order to adsorb organic contaminants on the carbon bed of one cell. Such waste stream flow in one cell can take place simultaneously with the steps of the process in which desorption of organic contaminants, enhancement of the adsorptive capacity of the carbon bed, or regeneration of the carbon bed of the other cell takes place. Monitoring the pollutant content of the waste stream exiting one electrolytic cell of the apparatus of the invention, as shown in the FIGURE, provides information as to the desired threshold level of oxidizable, organic material contaminant in the waste stream. Diversion of the flow of the waste stream into a second electrolytic cell containing a carbon bed can take place when this level is exceeded. Subsequently, the oxidizable, organic material pollutant present in the mass of carbon present in one electrolytic cell can be desorbed and decomposed resulting in the regeneration of the carbon bed, as described above. Simultaneously a second carbon bed in an electrolytic cell of the invention is used to adsorb organic pollutants from the waste stream.

During an adsorption mode which is conducted at open circuit potential, each electrolytic cell functions merely as a container for the beds of active carbon 80 and 90. During the adsorptive capacity enhancement mode the adsorptive capacity of either one or both carbon beds 80 and 90 for oxidizable organic materials, preferably, hydroxyaromatic compounds can be increased by positive polarization of the carbon bed in the presence of an electrolyte. In this mode, the electrolytic cells can be operated with the flow of aqueous waste shut off in conduits 160 and 170 by appropriate valves, not shown. Opening appropriate valves, not shown, in conduits 100 and 110 allows electrolyte from reservoir 10 to enter through conduits 100 and 110. During said enhancement mode, either one or both electrodes 40 and 50 in contact with the carbon bed are polarized positively and either one or both electrodes 60 and 70 are polarized negatively. Alternatively, desorption of an oxidizable organic material can take place by negative polarization of the carbon bed in the presence of an alkaline electrolyte, preferably, a highly alkaline electrolyte. Upon completion of said desorption or enhancement mode in the electrolytic cells 20 and 30, the electrolyte is made either alkaline or acid and the oxidizable, organic materials are destroyed or decomposed by the generation of hydroxyl ions in situ, as described under operation in the regeneration mode below and, thereafter, as previously described, the electrolyte is drained from the cells through conduits 120 and 130 and is stored in reservoir 10 for subsequent use.

During a regeneration mode in one embodiment of the invention in either one or both of electrolytic cells 20 and 30, the aqueous waste stream entering cells 20 and 30 through conduits 160 and 170, respectively, is prevented from entering electrolytic cells 20 and 30 by appropriate valves, not shown, and by appropriate valves, not shown, electrolyte enters either one or both cells 20 and 30 through conduits 100 or 110, respectively. During the regeneration mode, electrodes 40 and 50 are polarized negatively, an oxygen containing gas is fed to carbon beds 80 and 90 through conduits 140 and 150, respectively, and electrodes 60 and 70, which are insulated from the carbon beds 80 and 90 by foraminous plastic retaining elements 200 and 210, are polarized positively. The cell is operated in the regeneration mode to generate hydroxyl radicals for a sufficient time to substantially destroy the oxidizable, organic materials desorbed from carbon beds 80 and 90 after operation of the cells in the adsorption mode. During operation in the desorption mode, the concentration of contaminant in the aqueous electrolyte is first increased by conducting electrolysis at a pH of 12.5 or higher. Preferably, a compound containing iron (II) is then added to the electrolyte and the pH is reduced to about 2 to about 3 or a mixture of a chelating agent and, preferably, a compound containing iron III is added to the electrolyte and the pH reduced to about 8 to about 9. During subsequent electrolysis, carbon beds 80 and 90 are polarized negatively. Thereafter, electrolyte is removed through conduits 120 and 130 and is stored in reservoir 10 for future use. In the adsorption mode for removal of contaminants from waste water, purified waste water exits via conduits 180 and 190.

It is apparent that by appropriate valving one cell can be operated to remove oxidizable wastes from an aqueous waste stream by adsorption on a mass of carbon while the other cell can be operated simultaneously to regenerate the adsorptive capacity of a mass of carbon made an electrode of the cell.

Thus, the process can be operated in one embodiment of the invention utilizing the apparatus shown in the FIGURE so as to employ either one or both of the electrolytic cells for the removal of organic material from waste water in either an adsorption mode, a desorption mode or in a regeneration mode. Where only one of the cells 80 or 90 is operated in an adsorption mode for the removal of contaminants from an aqueous waste stream, the apparatus of the invention permits the operation of the remaining electrolytic cell in a desorption or regeneration mode. Thus, each of the cells 80 and 90 can be operated independently of the other cell. In addition, the use of a series of more than two electrolytic cells can allow operation in each of said modes independently of the other cells.

In another embodiment of the invention in which the adsorbent material is a conductive adsorbent such as active carbon or a non-conductive, synthetic adsorbent, the process can be operated in a desorption vessel which need not be an electrolytic cell but merely a vessel in which the adsorbent material to be regenerated is desorbed of an oxidizable, organic, material by contact with an aqueous liquid at a preselected pH. Subsequent to desorption of the oxidizable, organic material into the aqueous liquid, the enriched aqueous liquid can be passed to a second vessel which can be an electrolytic cell for the production of hydrogen peroxide in which hydroxyl radicals are produced by the previously described Fenton's Reagent System at either low pH or high pH or, alternatively, wherein hydroxyl radicals are produced by the reaction of hydrogen peroxide with ultraviolet light, ozone, or a combination of ultraviolet light and ozone.

It is important to note that desorption of the oxidizable, organic material into the aqueous liquid may be continued by recycling the aqueous liquid, after it exits the second vessel, back to the desorption vessel. In this way, the aqueous liquid is alternately enriched in the oxidizable, organic material by passing it through the desorption vessel, and then impoverished by passing it through the second, destruction, vessel. The adsorbent is thereby continually, to a larger and larger extent, partially regenerated, until sufficient oxidizable, organic, material has been removed in total, that the adsorbent can again be used in an adsorption mode for the removal of contaminants from the aqueous waste stream.

MODES FOR CARRYING OUT THE INVENTION

In the Examples which follow an aqueous one molar sodium sulphate and/or sodium hydroxide solution has been used as the electrolyte during enhancement, desorption, and regeneration modes. Preferably, the concentration range of this salt as used in the electrolyte of the invention is about 0.3 molar to about 2.0 molar with the upper limit being set by the solubility limits of the salt at the actual temperature of operation of the electrolytic cell. The most preferred concentration for the use of sodium sulphate as an electrolyte is 0.75M to 1.25M. The upper limit of the current density during a regeneration mode in the electrolytic cell of the invention will be determined by the mass transfer of oxygen to the reaction site at the carbon bed cathode during regeneration of the carbon bed. A current density which is so high that oxygen diffusion at the carbon bed cathode cannot sustain the depletion of oxygen resulting from reduction at the cathode will allow hydrogen evolution to occur with probable damage to the carbon bed cathode such that the adsorptive capacity of the carbon will be reduced. The lower limit of current density is governed primarily by economic and practical constraints such that an unacceptably long time will be needed to destroy the pollutants adsorbed on the carbon bed if too low a current density is used. In the Examples which follow a current density of about 7.75 milliamperes per centimeter square has been used.

In experimental work not disclosed herein, lower current densities during a regeneration mode have been used which result in a slower substantial destruction of the organic pollutant. In addition, current densities as high as 25.4 milliamps per square centimeter have also been used. The operative limits for current density are, generally, 2.5 milliamps per square centimeter to about 60 milliamps per square centimeter, preferably, about 10 to about 25 milliamps per square centimeter.

Electrochemical cells and a reservoir container are utilized in the process of the invention, generally, in accordance with the schematic illustration shown in the FIGURE. Each electrolytic cell contains an electrode constructed of a titanium mesh coated with a platinum-iridium coating. This electrode is insulated from the carbon bed by a foraminous plastic element which also acts as a retainer for the carbon bed. The electrode opposite in polarity to the carbon bed is the anode in a regeneration phase and is the cathode in a desorption or enhancement phase. The electrodes are connected to a power supply by wires. For the carbon bed electrode, it is generally necessary to distribute the electrical current into the bed by a current distributor such as a nickel or stainless steel mesh, or equivalent material. Generally, the carbon bed can be composed entirely of active carbon. Preferably, the carbon bed is composed of a mixture of active carbon and composite chips made in accordance with the procedure described in U.S. Pat. No. 4,481,303. Generally, these chips are made by absorbing carbon onto graphite utilizing a Teflon® binder.

EXAMPLE 1

An electrolytic cell is assembled utilizing the coated titanium electrode described above with composite chips forming the carbon bed, generally, as described above. Specifically, the carbon used to coat the graphite chips is a high surface area carbon black sold under the trade name Vulcan XC72R. This material is graphitic in nature and, thus, is characterized as ordered in structure and having good electrical conductivity. The BET surface area of Vulcan XC72R is 175 square meters per gram. An aqueous waste stream is simulated by adding 103.5 parts per million of phenol to distilled water. This is circulated through the carbon chips under open circuit allowing the carbon chips to adsorb phenol over a 16 hour period. The concentration of phenol in the waste stream drops to 92.1 parts per million after adsorption.

Thereafter, the flow of the simulated waste stream is shut off and the simulated waste water circulated to the cell is modified to a closed loop system containing a 1M concentration of sodium sulphate and the pH is adjusted to 12.5 by adding an aqueous solution of sodium hydroxide. Oxygen is supplied to the carbon bed at a rate of about 30 to 40 cubic centimeters per minute. The carbon bed is polarized negatively over a 2 hour period at a current density of 7.75 milliamps per square centimeter and a cell voltage of about 3–5 volts. It should be noted that, at this alkaline pH and negative polarization, it is believed that phenol is stripped from the carbon adsorbent into the electrolyte, thus making the phenol more amenable to destruction. After 2 hours, the hydrogen peroxide concentration is measured as 0.05 grams per liter. At the end of this period, the pH is adjusted to 2–3 with sulfuric acid and iron (II) sulphate is added to give a 0.16 millimolar solution. The combination of electrolytic oxygen reduction to produce hydrogen peroxide and the addition of soluble iron (II) at a pH of 2 to 3 results in the formation of hydroxyl radicals, the active component of Fenton's reagent, in the electrolyte. Almost all the phenol in the solution is destroyed, as indicated by the concentration of phenol in the electrolyte, 0.02 parts per million. It is theorized that the phenol adsorbed on the carbon bed is removed, or stripped, by the cathodic polarization of the carbon bed and the stripped phenol is at least partially converted to a water soluble phenate by reaction with the highly alkaline electrolyte prior to being decomposed by the Fenton's reagent formed in situ, thus, regenerating the carbon bed.

To confirm the fact that the carbon bed is regenerated by the above procedure, the adsorbent capacity of the carbon bed is evaluated by performing a second adsorption cycle similar to the cycle described above in order to remove some of the phenol from the simulated waste stream. In this second adsorption cycle the initial concentration of phenol in a simulated waste stream is 102 parts per million. After cycling the aqueous waste stream through the carbon bed over a 16 hour period, the concentration of phenol in the waste stream drops to 92.4 parts per million. After conducting a second regeneration cycle similar to that described above, the concentration of phenol in the electrolyte drops to 0.003 parts per million.

Since iron oxides may precipitate upon the composite chips via hydrolysis reactions during the regeneration cycle conducted at a pH of about 2 to about 3, it is considered necessary to wash the composite chips subsequent to the regeneration cycle with an aqueous acid solution in order to solubilize and, thereafter, remove iron oxides or hydroxides which are formed. To accomplish this acid wash, 300 cubic centimeters of 3M sulfuric acid are flushed through the cell for about 1 hour. Subsequently, the acid solution is removed from the cell and the carbon chips are washed with distilled water.

EXAMPLE 2

The cell of Example 1 is used to perform three adsorption/destruction cycles, as described in Example 1, utilizing the simulated waste stream and the electrolyte solutions described therein. In these cycles, the destruction of adsorbed organic material on the carbon bed is again accomplished utilizing electrogenerated hydrogen peroxide which is reacted with ferrous ions to produce hydroxyl radicals at a pH of about 2 to about 3.

A fourth cycle is performed as follows: A simulated waste stream containing 816 parts per million of phenol in 250 cubic centimeters of distilled water is circulated through the electrolytic cell at open circuit potential over a period of about 60 hours. After this time, the phenol concentration in the waste stream drops to 727 parts per million. Thereafter, the flow of the simulated waste stream is shut off and the aqueous waste stream remaining is modified to contain a one molar concentration of sodium sulphate which is adjusted with sodium hydroxide to a pH of 12.5. This electrolyte is circulated through the carbon bed while the electrodes of the electrolytic cell are connected to a power supply with the carbon bed being polarized cathodic at 26.4 milliamps per square centimeter over a period of one hour. During this time the hydrogen peroxide in solution in the electrolyte increases from zero to 0.5 grams per liter and the phenol concentration drops to 675 parts per million.

This result is explained on the theory that the hydrogen peroxide formed at the cathode is oxidized at the anode with a small amount of hydroxyl radicals being formed during oxidation of the hydrogen peroxide. These hydroxyl radicals oxidize some of the phenol present in the electrolyte.

Thereafter, the pH of the electrolyte is reduced to about 8 to about 8.5 and ferric nitrate is added to the electrolyte so as to obtain a concentration therein of 0.01M. At the same time, ethylenediaminetetraacetic acid is added to the electrolyte so as to obtain a concentration therein of 0.02M. The solution immediately turns a rose color which is characteristic of a complex formed by the ferric ion and EDTA. A current density of 26.4 milliamps per square centimeter is maintained on the cathodically polarized carbon bed during the subsequent 16 hours. Thereafter, the phenol concentration in the electrolyte is reduced to 0.003 part per million.

In order to confirm the fact that the carbon chip bed is regenerated by the above procedure during which the electrolyte is adjusted to a pH of about 8 to about 8.5, a fifth adsorption/destruction cycle is conducted using the same carbon chip bed subsequent to running the regeneration cycle above. The initial phenol concentration of the simulated aqueous waste stream is 802 parts per million. Circulating the waste stream through the cell for at least 16 hours with the carbon bed polarized cathodic at 26.4 milliamps per square centimeter at a pH of 12.5 results in a waste stream phenol concentration of 788 parts per million. Thereafter, the pH of the electrolyte is reduced to about 8 to about 8.5 and ferric nitrate is added to the electrolyte so as to obtain a concentration therein of 0.01M. At the same time, ethylenediaminetetraacetic acid is added to the electrolyte so as to obtain a concentration of 0.02M. The solution immediately turns a rose color which is characteristic of a complex formed by the reaction of ferric ion and EDTA. A current density of 26.4 milliamps per square is maintained on the cathodically polarized carbon bed during the subsequent 16 hours. Thereafter, the phenol concentration in the electrolyte drops to 1.5 parts per million, hereafter ppm.

EXAMPLE 3

After each of the fourth and fifth cycles described in Example 2 for regeneration of the carbon bed at a pH of about 8 to about 8.5 over a period of 16 hours, the electrolyte of the electrolytic cell is rejuvenated with a second addition of ferric nitrate and EDTA similar to the first addition so as to provide a concentration of 0.01M ferric nitrate and 0.02M EDTA in the electrolyte. Thereafter, the cell is operated for 16 hours at a current density of 26.4 milliamps per square centimeters with the carbon bed polarized cathodic. Results indicate an additional reduction of phenol in the electrolyte to 2.5 parts per billion, hereafter ppb, (5th cycle) and 4.9 ppb (6th cycle).

EXAMPLE 4

An electrolytic cell is assembled similar to that described in Example 1 except the carbon used to coat the graphite is a powdered activated carbon sold by Anachemia as catalogue #2151. Three adsorption-destruction cycles utilizing the low pH generation of hydroxyl radicals are then carried out in accordance with the procedure of Example 1. A fourth adsorption cycle is then performed by adding phenol to 250 cubic centimeters of distilled water to give a concentration of 807 ppm. This solution is recirculated to the cell for 16 hours after which the solution concentration of phenol is re-measured as 563 ppm. The residual phenol solution is discarded and 250 cubic centimeters of 1 molar sodium sulphate is recirculated to the cell. The pH is adjusted to 12.5 with sodium hydroxide, and after establishing a flow of 30–40 cubic centimeters per minute of oxygen, the carbon bed is polarized negatively at a current density of 26.4 milliamperes per square centimeter. After 1 hour, the phenol in solution is determined to be 81.7 ppm. thus indicating that 20.4 milligrams of the previously adsorbed phenol is stripped off the carbon bed. The pH is then adjusted to pH 2.9 and iron (II) sulphate is added to give a 0.16 millimolar solution. After 1 hour the solution phenol concentration is measured as 4.4 ppb.

This example illustrates that, for phenol, a negative polarization and an alkaline environment enhances desorption or stripping of the contaminant from the carbon bed thus allowing reaction with the in situ generated Fenton's reagent resulting in the decomposition of the phenol and regeneration of the carbon bed. It is likely that the optimum pH and desorption potential will vary for different organics. For example, it may be expected that organic amines would desorb from the carbon bed more effectively at a low pH since an amine hydrochloride will form and it is generally accepted that ionic organics adsorb less effectively than non-ionic organics.

EXAMPLE 5

Control, Forming no Part of this Invention

Two beakers are set up, each with 250 cubic centimeters of distilled water and 4.47 grams of granulated activated carbon, GAC, sold under the trade name Anachemia #2157. About 200 milligrams of phenol are added to each beaker and the resultant solution and slurry are stirred for 18 hours. The solution concentration is measured for each beaker at the end of this time and found to be 1.07 and 1.04 ppm, respectively, for beakers #1 and #2. To beaker #1, 35.5 grams of sodium sulphate are added and dissolved. The pH of the solution in beaker #1 is adjusted to 2.5 with sulfuric acid and then 88.2 milligrams of iron (II) sulphate heptahydrate are added.

To beaker #2, 35.5 g of sodium sulphate are added and dissolved. The pH of the solution in beaker #2 is adjusted to 2.5 with sulfuric acid, and then 3.7 cubic centimeters of 340 gram per liter hydrogen peroxide and 88.0 milligrams of iron (II) sulphate heptahydrate are added.

The pH of both resultant solutions is monitored with time and maintained between 2.5 and 3.0 with sulfuric acid. Both solutions are stirred for a further 18 hours. At the end of this time, both solutions are filtered, and the phenol that had adsorbed onto the GAC in each case is extracted from the GAC with two separate, 200 cubic centimeter aliquots of acetone. The total phenol extracted from the GAC in beaker #1 is 139.7 milligrams. The phenol extracted from the GAC in beaker #2 is 133.0 milligrams.

The above experiment illustrates that the use of Fenton's reagent alone, which is produced in situ in the solution contained in beaker #2, will not result in the decomposition of phenol or presumably other organics when the phenol remains adsorbed on an activated carbon. It is theorized that the hydroxyl radicals formed are not able to penetrate into the pores to access and destroy the phenol. It is observed that decomposition of the peroxide occurs in beaker #2 and, when this is complete, no hydroxyl radicals are formed.

In contrast to the above, it is theorized that in accordance with one embodiment of the process of the invention described herein, phenol is destroyed because the combination of continuous cathodic production of hydrogen peroxide, the alkaline electrolyte, and the negative polarization of the carbon bed ensures that phenol is desorbed or stripped from the carbon thus allowing the Fenton's reagent formed in-situ to destroy the desorbed phenol. The initial desorption and destruction of phenol will allow additional amounts of phenol to desorb and to be subsequently destroyed, the process continuing until the adsorbent capacity of the carbon is regenerated. The process of the invention is theorized as rendered more efficient because iron (III) is reduced to iron (II) at the cathode. This is evidenced by the pale green colored solution that slowly forms at the end of the regeneration process.

EXAMPLE 6

This Example illustrates that for phenol and related weakly acidic organic compounds, it is advantageous to perform a desorption cycle at a high pH of about 10 or higher. As disclosed in Example 5, Fenton's reagent will not destroy phenol when the phenol is adsorbed on carbon. By performing a desorption or stripping cycle at a high pH, a phenolate salt is formed which is more water soluble than the phenol and, accordingly, is desorbed from the carbon.

An electrolytic cell is assembled in accordance with the procedure of Example 1 except that the carbon bed is composed of a mixture of approximately 50 percent by weight of the composite chips described in Example 1 and about 50 percent by weight of a commercial granular activated carbon having a mesh size of about 12 to about 20 and sold by Anachemia as catalogue No. 2154. The carbon bed is exposed to a simulated waste water containing 800 ppm phenol in 250 cubic centimeters of water. The phenol is subsequently desorbed from the carbon by negative polarization of the carbon at a pH of about 12.5 over a period of 2 to 3 hours in cycles 1–25. The desorbed phenol is exposed to Fenton's reagent in accordance with the procedure of Example 1 by modifying the simulated waste water to contain a 1M concentration of sodium sulphate and adjusting the pH with sulfuric acid to 2–3 and adding iron (II) sulphate to provide a 0.16 millimolar solution thereof. This procedure is repeated for 25 cycles of desorption and destruction of the desorbed phenol. The adsorption capacity of the carbon is slowly decreased with each succeeding cycle. This is shown in Table I by the increasing amounts of phenol remaining after open circuit adsorption in cycles 10–26 and is theorized to be the result of the incomplete destruction of adsorbed phenol during the destruction cycle at low pH. During cycles 26–30, the above procedure is modified so as to extend the desorption treatment from about 3 hours in cycles 1–25 to about 45 hours in cycles 26–30. The final phenol solution concentration after the destruction cycle at low pH is shown in the attached Table as decreasing significantly when the extended desorption cycle is used in cycles 26–30. In addition, the capacity of the carbon bed is increased considerably following the desorption and destruction in cycles 26–30, as indicated by the solution concentration after open circuit adsorption.

TABLE I

Phenol Concentration in Water

| Adsorption & Decomposition Cycle # | Initial (ppm) | After Open Circuit Adsorption (ppm) | After Stripping 2–3 hrs. (ppm) | After Stripping 45 Hours (ppm) | Final (ppb) |
| --- | --- | --- | --- | --- | --- |
| 1  | 804.8 | 1.33  | 55  | —    | 11.3 |
| 10 | 814.0 | 44.4  | 259 | —    | 8.9  |
| 20 | 801.6 | 122.8 | 334 | —    | 18.7 |
| 26 | 804.4 | 179.0 | 323 | 7.03 | ~10  |
| 28 | 799.6 | 116.0 | 102 | 5.8  | 27   |
| 30 | 804.8 | 56.7  | 223 | 8.6  | ~10  |

EXAMPLE 7

This Example illustrates the use of a carbon bed composed of a commercial granular activated carbon having a mesh size of about 12 to about 20 and sold by Anachemia as catalogue #2154 which is treated to contain a Teflon polymer. The Teflon polymer is introduced into the carbon by heating a slurry of the granular activated carbon with an emulsion of Teflon sold under the trade name designation Teflon 30B by the DuPont Company. The granular activated carbon subsequent to heating with the Teflon emulsion is separated from the water and dried at about 100° C. and, thereafter, baked at 300°–305° C. for two hours. The carbon bed is exposed to a simulated waste water containing 800 ppm phenol in 250 cubic centimeters of water.

The phenol is subsequently desorbed from the carbon bed in an electrolytic cell by stripping under negative polarization of the carbon at a pH of about 12.5 both for a period of two to three hours and over a period of 48 hours, as shown in Table II. In contrast to the results obtained in Example 6, which are reported in Table I, the adsorption capacity of the carbon, after 10 cycles of adsorption and decomposition, remains essentially unchanged. This is shown in Table II by reference to the phenol concentration after open circuit adsorption. the adsorption capacity of the carbon after cycle 1 is 99.5%. After each successive cycle shown in Table II, the adsorption capacity of the carbon in percent is as follows: 99.6; 99.3; 99.2; 99.2; and 99.2 The desorbed phenol is then exposed to Fenton's reagent in accordance with the procedure of Example 1 by modifying the simulated waste water to contain a 1M concentration of sodium sulphate and adjusting the pH with sulfuric acid to 2–3 and adding iron (II) sulphate to provide a 0.16 millimolar solution thereof.

This procedure is repeated for four cycles of desorption for two to three hours only and destruction of the phenol as described above. As shown in Table III, after a series of four cycles of two to three hour desorption, reference to the final phenol concentration indicates the adsorption capacity of the carbon bed is slowly, decreasing with each succeeding cycle. Contrastingly, as shown in Table II the adsorption capacity of the carbon bed, as indicated by the final phenol concentration, remains essentially unaltered over the four 48 hour cycles of desorption and subsequent destruction of the phenol.

TABLE II

Phenol Concentration in Water

| Adsorption & Decomposition Cycle # | Initial (ppm) | After Open Circuit Adsorption (ppm) | After Stripping 2–3 Hours (ppm) | After Stripping 48 Hours (ppm) | Final (ppb) |
| --- | --- | --- | --- | --- | --- |
| 1  | 805.2 | 7.1 | 178 | 7.7 | 19.6 |
| 2  | 806.4 | 3.4 | 131 | 9.2 | 8.3  |
| 3  | 802.0 | 5.3 | 214 | 5.3 | 10.1 |
| 4  | 800.0 | 6.3 | 227 | 6.1 | 10.0 |
| 6  | 800.4 | 7.5 | — | — | — |
| 10 | 800.8 | 6.5 | — | — | — |

TABLE III

Phenol Concentration in Water

| Adsorption and Decomposition Cycle # | Initial (ppm) | After Open Circuit Adsorption (ppm) | After Stripping 2–3 Hours (ppm) | Final (ppb) |
| --- | --- | --- | --- | --- |
| 1 | 804.8 | 1.33 | 55  | 11.3 |
| 2 | 811.6 | 9.75 | 90  | 6.0  |
| 3 | 792.8 | 16.0 | 169 | 32.2 |
| 4 | 820.0 | 31.0 | 191 | 22.1 |

EXAMPLE 8

Example 7 is repeated except that the phenol is adsorbed from a simulated waste water containing 799 ppm phenol in 250 cubic centimeters of water onto the carbon bed for 70 hours. After adsorption, the phenol concentration in the simulated waste water is 1.2 ppm. The phenol is desorbed from the carbon bed to regenerate the carbon in a reaction vessel without polarization of the carbon, by passing an aqueous solution of sodium hydroxide through the carbon bed at a 1 molar concentration over a period of 24 hours. After this period of desorption, the equilibrium concentration of phenol in the water is 253 ppm.

This aqueous solution is then passed as the electrolyte to an electrolytic cell and a constant voltage of 5.1 volts is imposed on the electrodes of the cell.

The electrolytic cell comprises a carbon bed cathode and a platinum/iridium coated titanium anode. No membrane is used to separate the electrodes of the cell. Oxygen gas is fed to the cell at a rate of about 30 cubic centimeters per minute. After 72 hours of operation, the phenol concentration in the electrolyte of the cell is reduced to 9.6 ppm.

Using the above regenerated carbon bed, a second adsorption cycle is carried out utilizing 800 ppm phenol in 250 cubic centimeters of water as the simulated waste water. After an adsorption cycle of 65 hours utilizing the carbon bed regenerated in accordance with the procedure described above, the carbon bed is found to absorb essentially all the phenol in the simulated waste water leaving a phenol concentration in the simulated waste water of 1.4 ppm.

The carbon bed is subjected to a second desorption cycle, as described above, to regenerate the carbon in a reaction vessel, without polarization of the carbon, and using an aqueous solution of sodium hydroxide at a 1 molar concentration.

Concurrent with this desorption, decomposition of the phenol in this aqueous solution, in accordance with the procedure described above, except over a period of 170 hours, results in a phenol concentration in the electrolyte of 5.9 ppm.

The carbon bed after being subjected to the second desorption cycle described above is exposed to a simulated waste water which contains 801 ppm phenol in 250 cubic centimeters of water. After adsorption for 67 hours, the concentration of phenol in the water is reduced to 3 ppm.

EXAMPLE 9

Example 7 is repeated by first adsorbing phenol from a simulated waste water onto the carbon bed. Subsequently, the phenol is desorbed from the carbon bed in an electrolytic cell by stripping under negative polarization of the carbon bed at a pH of 12.5. The decomposition of the phenol in the aqueous solution, which is obtained subsequent to desorption, is accomplished by utilizing this solution as the electrolyte of an electrolytic cell having a carbon bed cathode and a platinum-iridium coated titanium anode which is operated at a constant voltage of 5.1 volts with an oxygen gas feed to the cell at a rate of about 30 cubic centimeters per minute. After 72 hours of operation, the phenol concentration in the electrolyte of the cell is reduced to an amount comparable to that obtained in Example 8.

EXAMPLE 10

Example is 8 is repeated except that after desorption of the phenol from the carbon bed, the aqueous solution obtained is passed as the electrolyte to an electrolytic cell and sodium sulfate is added to make a one molar concentration in the electrolyte. The electrolytic cell comprises a carbon bed cathode and a platinum/iridium coated titanium anode. No membrane is used to separate the electrodes of the cell and oxygen gas is fed to the cell at a rate of about 30 cubic centimeters per minute. The pH of the electrolyte is adjusted to 2–3 with sulfuric acid and iron (II) sulfate is added to obtain a 0.16 millimolar solution. The combination of electrolytic oxygen reduction to produce hydrogen peroxide and the addition of soluble iron (II) at a pH of 2 to 3 results in the formation of hydroxyl radicals, the active component of Fenton's Reagent, in the electrolyte. Almost all the phenol in the electrolyte solution is destroyed subsequent to operation of the cell.

EXAMPLE 11

The adsorption onto a carbon bed of the simulated waste water and the desorption of the adsorbed phenol from the carbon bed, as set forth in Example 8 is repeated. The aqueous solution obtained is passed as the electrolyte to an electrolytic cell subsequent to reducing the pH of the electrolyte to about 8 to about 8.5, adding ferric nitrate to obtain a concentration therein of 0.01 molar and adding ethylenediaminetetraacetic acid to the electrolyte so as to obtain a concentration therein of 0.02 molar. The electrolytic cell comprises a carbon bed cathode and a platinum/iridium coated titanium anode. No membrane is used to separate the electrodes of the cell. Electrolysis is conducted by maintaining a constant voltage of 5.1 volts on the electrodes of the cell while oxygen gas is fed to the cell at a rate of about 30 cubic centimeters per minute. After operation of the cell almost all of the phenol in the electrolyte is destroyed.

EXAMPLE 12

Example 8 is repeated except that after the desorption cycle, a destruction cycle is performed in a separate vessel in which hydroxyl radicals are produced by the reaction of ultraviolet light and ozone to substantially reduce the phenol concentration in the aqueous solution.

EXAMPLE 13

Example 8 is repeated except that after the desorption cycle, the aqueous solution obtained thereby is passed to a separate vessel and the phenol decomposed by reaction with hydroxyl radicals produced by the reaction of ultraviolet light with hydrogen peroxide.

EXAMPLE 14

Example 8 is repeated except that after the desorption cycle, the aqueous solution obtained thereby is passed to a separate vessel and reacted with hydroxyl radicals produced by the reaction of ozone and hydrogen peroxide.

EXAMPLE 15

Example 8 is repeated except that there is substituted for the carbon bed, a non-conductive synthetic adsorbent derived from macroreticular copolymer technology. After the adsorption and desorption cycles, the aqueous solution obtained is passed as the electrolyte to a water electrolysis electrolytic cell in order to decompose the phenol present in this aqueous solution. After operation of the electrolytic cell, almost all the phenol in the electrolyte of the cell is destroyed.

EXAMPLE 16

Example 15 is repeated except that decomposition of the aqueous solution obtained after desorption of the phenol from the non-conductive adsorbent is accomplished by utilizing this aqueous solution as an electrolyte of an electrolytic cell for the production of hydrogen peroxide. The electrolyte is modified by the addition of a one molar concentration of sodium sulfate and the pH is adjusted to 2–3 with sulfuric acid subsequent to the addition of iron (II) sulfate to give a 0.16 millimolar solution. The combination of electrolytic oxygen reduction to produce hydrogen peroxide and the addition of soluble iron (II) at a pH of 2–3 results in the formation of hydroxyl radicals. Almost all the phenol in the solution is destroyed upon operation of the electrolytic cell.

EXAMPLE 17

Example 8 is repeated substituting a non-conductive synthetic adsorbent derived from macroreticular copolymer technology for the carbon adsorbent of Example 8. Subsequent to adsorption and desorption cycles, as described in Example 8, the aqueous solution obtained thereby is used as an electrolyte in an electrolytic cell comprising a carbon bed cathode and a platinum/iridium coated titanium anode. No membrane is used to separate the electrodes of the cell and oxygen gas is fed to the cell at a rate of about 30 cubic centimeters per minute. Prior to operation of the electrolytic cell, ethylenediaminetetraacetic acid is added to the electrolyte so as to obtain a concentration therein of 0.02 molar and ferric nitrate is added to the electrolyte so as to obtain a concentration therein of 0.01 molar. Upon operation of the electrolytic cell, almost all the phenol in the electrolyte is destroyed.

EXAMPLE 18

Example 15 is repeated except that the aqueous solution of phenol obtained after the desorption cycle is led to a reaction vessel in which the phenol therein is reacted with hydroxyl radicals produced by the reaction of ultraviolet light and ozone. Almost all the of phenol is destroyed thereby.

EXAMPLE 19

Example 15 is repeated except that after the desorption cycle, the aqueous solution obtained thereby is passed to a vessel in which the phenol is reacted with hydroxyl radicals obtained by the reaction of ultraviolet light and hydrogen peroxide. Almost all of the phenol is destroyed thereby.

EXAMPLE 20

Example 15 is repeated except that the aqueous solution obtained subsequent to the desorption cycle is passed to a vessel and the phenol contained therein is reacted with hydroxyl radicals obtained by the reaction of ozone and hydrogen peroxide. Almost all of the phenol is destroyed thereby.

While this invention has been described with reference to certain specific embodiments, it will be recognized by those skilled in the art that many variations are possible without departing from the spirit and scope of the invention, and it will be understood that it is intended to cover all changes and modifications of the invention disclosed herein for the purpose of illustration which do not constitute departures from the spirit and scope of the invention.

What is claimed is:

1. In a process for regenerating the adsorptive capacity of a mass of an adsorbent material comprising a conductive adsorbent or a non-conductive, synthetic adsorbent and an oxidizable, organic material, the improvement wherein said oxidizable, organic material is desorbed from said adsorbent material and substantially decomposed in a batch or cyclic process comprising:

A) in a desorption stage, passing a first aqueous stream at a preselected pH to said adsorbent material, selected from the group consisting of activated carbon, polymeric adsorbents, and carbonaceous adsorbents, to desorb said oxidizable, organic material therefrom and produce a second aqueous stream comprising said organic material and B) passing said second aqueous stream to a decomposition stage and contacting said aqueous stream with an oxidant.

2. The process of claim 1 wherein in said desorption stage, said mass of adsorbent material comprises carbon, said first aqueous stream is acidic or alkaline, and said carbon is positively or negatively polarized.

3. The process of claim 1 wherein said decomposition stage comprises an electrolytic cell or a vessel comprising hydroxyl radicals produced by reacting hydrogen peroxide with a reactant selected from the group consisting of transition metal ions, ultraviolet light, and ozone or hydroxyl radicals produced by reacting ultraviolet light and ozone.

4. The process of claim 3 wherein said second aqueous stream is made the electrolyte of an electrolytic cell in which said hydroxyl radicals are produced at a pH of about 1 to about 4 or produced at a pH of about 8 or higher in the presence of a chelating agent.

5. The process of claim 4 wherein said electrolyte comprises hydrogen peroxide, a transition metal or ions thereof, and hydroxyl radicals and electrolysis is conducted in said cell while passing an oxygen containing gas to said cell.

6. The process of claim 5 whereby desorption of said organic material comprises passing said first aqueous stream at an alkaline pH to said adsorbent material and wherein said adsorbent material comprises carbon and said oxidizable, organic material is selected from the group consisting of halogenated and non-halogenated organic compounds, fuel hydrocarbons, and pesticides.

7. An apparatus for regeneration of the adsorptive capacity of an adsorbent material comprising a conductive adsorbent or a non-conductive, synthetic adsorbent and an oxidizable, organic material, said apparatus comprising means for desorbing and means for decomposing an oxidizable, organic material from said adsorbent material, said means for desorbing said organic material comprising a desorption vessel for passing a first aqueous stream at a preselected pH to said adsorbent material to desorb said organic material therefrom, thereby producing a second aqueous stream, said means for decomposing said organic material comprising a decomposition vessel for contacting said second aqueous stream with hydroxyl radicals, an oxidant produced in an electrolytic cell for water electrolysis or produced in an electrolytic cell for the production of a peroxide or an oxidant, and wherein said adsorbent material is selected from the group consisting of carbon, polymeric adsorbents, and carbonaceous adsorbents and said hydroxyl radicals are produced by reacting hydrogen peroxide with a reactant selected from the group consisting of transition metal ions, ultraviolet light, and ozone or produced by reacting ultraviolet light and ozone.

8. The apparatus of claim 7 wherein said means for decomposing said organic material comprises an electrolytic cell comprising:

A) an anode, a cathode, and an aqueous electrolyte maintained at a pH of about 1 to about 4 comprising hydrogen peroxide, transition metal ions, while conducting electrolysis and feeding an oxygen containing gas to said cell or B) an anode, a cathode, and an aqueous electrolyte comprising a complex of a transition metal and a chelating agent wherein said electrolyte is maintained at a pH of about 8 or higher while conducting electrolysis and feeding an oxygen containing gas to said cell.

9. The apparatus of claim 8 wherein said cathode consists of carbon and said chelating agent is selected from the group consisting of nitriloacetic acid; diethylenetriaminepentaacetic acid and salts thereof; hydroxyethylethylenediaminetriacetic acid and salts thereof; diethylenetriaminepentamethylene phosphoric acid and salts thereof; cyclohexylenedintrilotetraacetic acid and salts thereof; ethylenebis(oxyethylenenitrilo)tetraacetic acid and salts thereof; hemin; and ethylenediaminetetraacetic acid.

10. In a process for regenerating the adsorptive capacity of an adsorbent material comprising a conductive adsorbent or a non-conductive, synthetic adsorbent and an oxidizable, organic material, the improvement wherein said organic material is desorbed from said adsorbent material and substantially decomposed, in a process comprising:

A) in a first stage, contacting said adsorbent material with a first aqueous stream at a preselected pH to desorb said oxidizable, organic material therefrom and produce a second aqueous stream comprising said organic material, B) in a second stage, contacting said second aqueous stream comprising said organic material with an oxidant produced in an electrolytic cell for water electrolysis or produced in an electrolytic cell for the production of a peroxide or an oxidant comprising hydroxyl radicals to decompose said organic material, and wherein said first and second stages are operated simultaneously.

11. The process of claim 10 wherein in said first stage, said adsorbent material comprises carbon, said first aqueous stream is acidic or alkaline, and said carbon is polarized positively or negatively.

12. The process of claim 10 wherein said adsorbent material is selected from the group consisting of a carbon, a polymeric adsorbent, and a carbonaceous adsorbent, and said hydroxyl radicals are produced by reacting hydrogen peroxide with a reactant selected from the group consisting of transition metal ions, ultraviolet light, and ozone or produced by reacting ultraviolet light and ozone.

13. The process of claim 12 wherein said second aqueous stream is made the electrolyte of an electrolytic cell in which said hydroxyl radicals are produced at a pH of about 1 to about 4 or at a pH of about 8 or higher in the presence of a chelating agent.

14. The process of claim 13 wherein said electrolyte comprises hydrogen peroxide, a transition metal or ions thereof, and hydroxyl radicals and electrolysis is conducted in said cell while passing an oxygen containing gas to said cell.

15. The process of claim 14 whereby desorption of said organic material is accomplished by passing said first aqueous stream at an alkaline pH to said adsorbent material and wherein said adsorbent material is carbon and said oxidizable, organic material is selected from the group consisting of halogenated and non-halogenated organic compounds, fuel hydrocarbons, and pesticides.

16. A process for decomposing an oxidizable organic material in a contaminated aqueous waste stream comprising:

(A) contacting said aqueous waste stream with an oxidant comprising hydroxyl radicals to decompose said organic material wherein said oxidant is produced in an electrolytic cell for water electrolysis or said oxidant is produced in an electrolytic cell for the production of a peroxide and (B) wherein said hydroxyl radicals are produced in said electrolytic cell having an aqueous electrolyte at a pH of about 1 to about 4 or a pH of about 8 or higher in the presence of a chelating agent.

17. The process of claim 16 wherein said electrolyte comprises hydrogen peroxide, a transition metal or ions thereof, and hydroxyl radicals and electrolysis is conducted in said cell while passing an oxygen containing gas to said cell.

18. The process of claim 17 wherein said chelating agent is selected from the group consisting of nitriloacetic acid; diethylenetriaminepentacetic acid and salts thereof; hydroxyethylethylenediaminetriacetic acid and salts thereof; diethylenetriaminepentamethylene phosphoric acid and salts thereof; cyclohexylenedinitrilotetraacetic acid and salts thereof; ethylenebis (oxyethylenenitrilo)tetraacetic acid and salts thereof; hemin; and ethylenediaminetetraacetic acid.

19. The process of claim 17 wherein said oxidizable, organic material is selected from the group consisting of halogenated and non-halogenated organic compounds, fuel hydrocarbons, and pesticides.

* * * * *

UNITED STATES PATENT AND TRADEMARK OFFICE
CERTIFICATE OF CORRECTION

PATENT NO. : 5,904,832
DATED : May 18, 1999
INVENTOR(S) : Arthur L. Clifford, et al.

It is certified that error appears in the above-indentified patent and that said Letters Patent is hereby corrected as shown below:

Column 8, line 56, change "cyclohexylenedintrilotetraacetic" to -- cyclohexylenedinitrilotetraacetic--.

Column 12, line 13, after "destruction" delete ",".

Column 12, line 15, after "total," insert --so--.

Column 23, line 3, change "cyclohexylenedintrilotetraacetic" to -- cyclohexylenedinitrilotetraacetic--.

Signed and Sealed this

Ninth Day of November, 1999

Q. TODD DICKINSON

Attest:

Attesting Officer

Acting Commissioner of Patents and Trademarks